United States Patent [19]

Flakus

[11] Patent Number: 4,605,723
[45] Date of Patent: Aug. 12, 1986

[54] SHELF-STABLE, ISOCYANATE (NCO) FREE URETHANE UREA ACRYLATE RESINS

[75] Inventor: Werner Flakus, Recklinghausen, Fed. Rep. of Germany

[73] Assignee: Hüls Aktiengesellschaft, Marl, Fed. Rep. of Germany

[21] Appl. No.: 735,132

[22] Filed: May 17, 1985

[30] Foreign Application Priority Data

Jun. 13, 1984 [DE] Fed. Rep. of Germany ....... 3421826

[51] Int. Cl.$^4$ .............................................. C08G 18/10
[52] U.S. Cl. ........................................ 528/49; 528/69
[58] Field of Search ..................................... 528/49, 69

[56] References Cited

U.S. PATENT DOCUMENTS

| | | | |
|---|---|---|---|
| 3,384,623 | 5/1968 | Inoue et al. | 528/49 |
| 4,131,602 | 12/1978 | Hodakowski et al. | 528/49 |
| 4,133,723 | 1/1979 | Howard | 528/49 |
| 4,246,391 | 1/1981 | Watson | 528/49 |
| 4,507,458 | 3/1985 | Shinaki et al. | 528/49 |

*Primary Examiner*—Maurice J. Welsh
*Attorney, Agent, or Firm*—Oblon, Fisher, Spivak, McClelland & Maier

[57] ABSTRACT

A storage-stable, substantially NCO-free urethane urea acrylate which after radiation curing forms strongly adhering, solvent resistant, wear resistant coatings containing isophorone diisocyanate (IPDI) or adducts thereof which have been partially acrylated with one or more hydroxyacrylates to the extent of about 10–25 equivalent %, which material subsequently has been reacted to the extent of about 10–75 equivalent % with one or more polyhydroxy compounds, wherein the remaining NCO equivalents have been fixed with urea bonds with one or more primary or secondary diamino compounds having about 2 to 18 carbon atoms.

11 Claims, No Drawings

SHELF-STABLE, ISOCYANATE (NCO) FREE URETHANE UREA ACRYLATE RESINS

BACKGROUND OF THE INVENTION

1. Field of the Invention

The present invention relates to shelf-stable, isocyanate (NCO) free urethane urea acrylate resins.

2. Description of the Prior Art

Films and coatings obtained after radiation curing of urethane acrylate resins based on aliphatic or cyclic isocyanates have good characteristics such as mechanical properties, chemical resistance to solvents, gloss, flow properties, and light-stability. For example, urethane acrylates based on isophorone diisocyanate are known, from German OS No. 29 05 205.

However, such films and coatings have unsatisfactory wear characteristics and defective adhesion, particularly when applied to substrates comprised of plastic material.

It is well known that various thio compounds substantially increase adhesion properties of films if added to the resin before curing.

However, a disadvantage lies in the fact that the thio compounds impart an appreciable noxious odor to the liquid resins as well as to the cured coatings. Moreover, the toxicological aspects must be taken into account as well.

Attempts have been made at improving the adhesion of the coating by substantially tempering the radiation-cured coating at temperatures above 100° C. Curing times of c. 20 to 30 min have been used and have been found to be rather ineffective and impracticable.

Other proposals have been advanced for producing a high coating adhesion with low loss of volume of the liquid resin after curing, but these have not been shown conclusively to be of value.

Thus, a need continues to exist for films and coatings obtained after radiation curing which form well adhering, solvent resistant coatings with excellent wear properties, and which also have an extremely high shelf life.

SUMMARY OF THE INVENTION

Accordingly, it is an object of the present invention to provide a storage-stable, substantially NCO-free urethane urea acrylate which after radiation curing forms well adhering, solvent resistant coatings with excellent wear properties.

It is also an object of this invention to provide a storage-stable, substantially NCO-free urethane urea acrylate which has the ability to react with a multiplicity of chemical reactants to provide a broad spectrum of products.

It is, moreover, also an object of the present invention to provide a process for the preparation of the above-described storage-stable, substantially NCO-free urethane urea acrylates.

According to the present invention, the foregoing and other objects are attained by providing storage-stable, substantially NCO-free urethane urea acrylates which after radiation curing form strongly adhering, solvent-resistant, wear-resistant coatings which comprise isophorone diisocyanate (IPDI) or adducts thereof which have been partially acrylated with one or more hydroxyacrylates to the extent of about 10–25 equivalent %, which material has been subsequently reacted to the extent of 10–75 equivalent % with one or more polyhydroxy compounds, wherein the remaining NCO equivalents have been fixed with urea bonds with primary or secondary diamino compounds having about 2 to 18 carbon atoms.

DETAILED DESCRIPTION OF THE PREFERRED EMBODIMENTS

According to the present invention, it has been surprisingly found that excellent adhesion of the film to a large number of substrates is achieved if the radiation-curable resins based on isophorone diisocyanate contain a certain percentage of urea segments prepared in advance, in addition to urethane groups and acrylic groups.

The resin formation can be carried out in very simple fashion by partial conversion of NCO-containing acrylic derivatives with water or with diamines, in particular at room temperature.

The present invention provides shelf-stable, practically NCO-free urethane urea acrylates which after radiation curing form well adhering, solvent resistant coatings with good wear properties. These resins are comprised of isophorone diisocyanate and/or its adducts, partially acrylated with one or more hydroxyacrylates to the extend of about 10–25 equivalent %, which material subsequently has been reacted to the extend of about 10–75 equivalent % with one or more polyhydroxy compounds, wherein the remaining NCO equivalents have been fixed via urea bonds with primary or secondary diamino compounds having about 2–18 carbon atoms.

According to the present invention, resins are produced which have reproducible properties and extremely high shelf life, i.e., storage stability. A further outstanding property of the isophorone diisocyanates and adducts of the same e.g., derivatives and prepolymers, containing variously-reactive groups, is a remarkable ability to react satisfactorily to produce stabile products with a multiplicity of chemical structures, e.g. with diamines. Accordingly, a broad spectrum of urea components and additives with different structures can be produced.

In contrast with isophorone diisocyanate, many cyclic or aliphatic diisocyanates do not yield good results when their prepolymers are reacted with primary diamines. The urethane urea acrylates so obtained jell, become turbid, and have poor shelf life.

Surprisingly, the presently claimed urethane urea acrylates and their reactive compounds can be rapidly cured to form urea-free analog products, and in addition photoactivator additives can be used in lesser amounts.

The properties of the presently claimed urethane urea acrylates exceed those conventionally known in the art in the following respects:

(1) Outstanding adhesion of the cured film to plastic materials such as PVC, polyesters, polyimides, etc., and when bonded to metal.

(2) The resins and coatings have little or no odor.

(3) Shorter curing times, less requirement for photoinitiators, and longer shelf life, of the resins.

(4) Improved mechanical properties of cured films, lower wear, and improved solvent resistance.

Improvement of the storage life by means of urea-formation is a consequence of the nearly complete elimination of free NCO groups when the NCO-containing prepolymers are reacted with the specified diamines.

In the case of urea-free urethane acrylates produced exclusively by reaction with suitable hydroxyl derivatives, there is appreciable residual NCO (0.2-0.4% wt.%) in the resin, which upon storage causes increases in viscosity due to secondary reactions, e.g. with moisture in the air.

According to the method of the present invention, the claimed urethane urea acrylates are prepared by first partially acrylating the diisocyanates. Then, additional NCO groups are converted by reacting the same with hydroxy esters or hydroxy ethers, and the remaining NCO groups are converted quantitatively by reacting with the above-described diamines, to form an inert resin.

It is plausible that the number of equivalents of acrylic, hydroxy, and diamine compounds, as well as their structures, affect the nature of the resin and the properties of the cured film in a major and enduring way.

Depending on the viscosity of the reaction mixture, the use of a proportion of unsaturated, polymerizable extenders to vary the viscosity may be advantageous.

The sequence of reaction steps will now be illustrated:

First reaction step: Acrylation of the diisocyanate with hydroxyalkyl esters, to yield a partially acrylated IPDI:

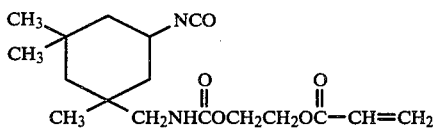

Second reaction step: Acrylic urethane resin formation with hydroxy esters or hydroxy ethers, to yield a urethane resin with an NCO at the terminus:

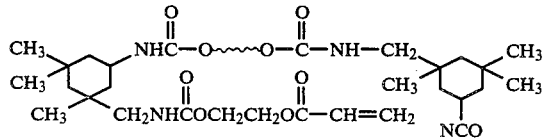

Third reaction step: Acrylic urethane urea resin formation with diamino compounds:

With a view toward ensuring long shelf life of the products, so that they can be stored in darkness more than 6 mo at 60° C., the reaction steps for the resin preparation should be carried out according to the scheme described. In this way, one can produce gel-free products with a reproducible resin viscosity, and cured films with reproducible mechanical properties. It is quite possible, with intensive cooling, to react all the reactants simultaneously in one reaction mixture, but this is not advantageous in view of the poor quality of the resulting resins and cured films.

In addition to IPDI, adducts or derivatives of IPDI (e.g. IPDI isocyanurate) are also suitable for preparing the presently claimed resins. The preferred acrylic derivatives for acrylation of the said isocyanates or isocyanate adducts are NCO-reactive, i.e., reacting with NCO acrylic derivatives such as hydroxyalkyl acrylates, e.g., hydroxyethyl acrylate, which are prepared in known fashion by reacting acrylic acid with the appropriate epoxide compounds.

While hydroxyalkyl acrylates are used advantageously as the acrylating agents, it is preferred to use hydroxy lower alkyl acrylates having about 1 to 4 carbon atoms. Of the $C_1$–$C_4$ alkyl groups which are preferentially used, such as methyl, ethyl, n-propyl, isopropyl or n-butyl, the ethyl species is the most preferred.

After partial acrylation of the diisocyanate, the properties of the subsequently cured films and coatings are adjusted by reaction of additional NCO groups with hydroxy esters or hydroxy ethers. Suitable polyhydroxy compounds may be any di-, tri-, or tetrafunctional hydroxy compound, having an aliphatic, cyclic, or aromatic structure, and having a molecular weight of 100–5,000, preferably 500–2,000. These types of compounds are well known and are commercially available.

Especially preferred as the polyhydroxy compounds are polytetrahydrofuran ether, or a mixture of adipic acid, 1,6-hexanediol and 2,2-dimethyl-1,3-propanediol.

The diamines which can be used for urea formation for the presently claimed resins include aliphatic, cycloaliphatic, or aromatic primary or secondary diamines, and primary/secondary diamines, with one amino group of each type, with a straight aliphatic hydrocarbon chain length 2 to 18 C atoms. Also, the diamines used for preparing the inventive resins may contain

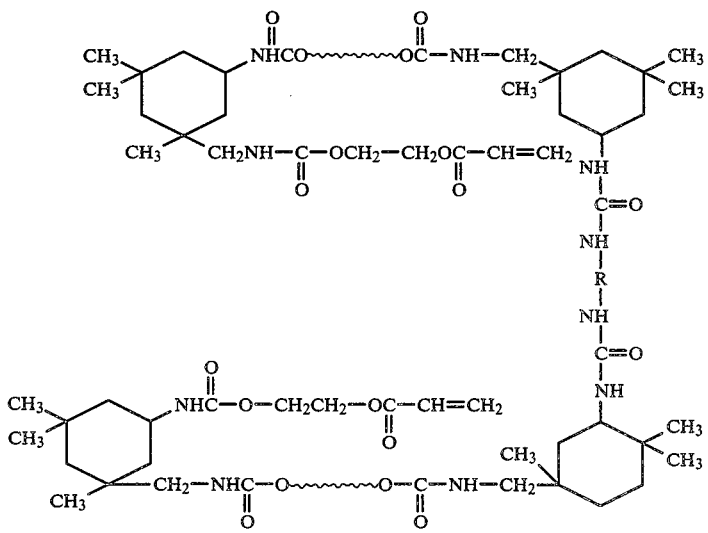

carboxylic acid ester groups, such as are formed, e.g., when acrylic or methacrylic esters are added to diamines:

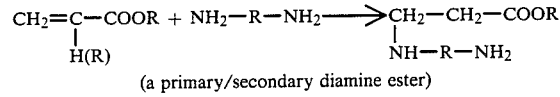
(a primary/secondary diamine ester)

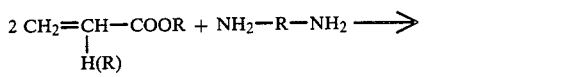

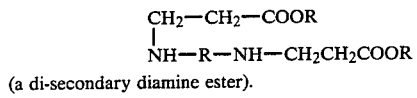
(a di-secondary diamine ester).

In applications, when adjusting the desired viscosity conditions of the resins it is possible to use so-called "reactive extenders", which are unsaturated monomers. Compounds which may be used as "reactive extenders" include higher boiling acrylic esters, N-vinylpyrrolidone, and a large number of other well known unsaturated compounds.

In the manufacturing of the resins, suitable photoinitiators, e.g., benzoin ethers, acetophenone derivatives, etc., can be mixed into the resin, in amounts of about 1-2% by wt. When electron curing is used, this type of additive is omitted. It may also be advantageous to add UV stabilizers to the resin at the manufacturing stage. As examples, are derivatives of HALS (Hindered Amine Light Stabilizer), in amounts of about 1-2% by wt.

The resins may be cured by UV irradiation, electron irradiation, or peroxide catalysis.

The present invention will now be further illustrated by certain examples and references which are provided for purposes of illustration only and are not intended to limit the present invention.

EXAMPLE 1 (COMPARISON EXAMPLE)

Urethane acrylate resin, based on IPDI and a hydroxy ether.

238.8 g 2-hydroxyethyl acrylate (2 mol) (OH-number=469 mg KOH/g) was added dropwise to a vessel containing 444 g IPDI (2 mol) and 0.068 g dibutyltin laurate (DBTL), over a period of about 2 hr under stirring. The reaction was carried out under cooling at 20°-25° C. until the NCO content of the solution was 12.3-12.4 wt.%. 0.27 g DBTL and 0.33 g hydroquinone were added, and the reaction product (of the preceding step—i.e. the mixture) was heated to 70° C. At this temperature, over a period of 2-3 hr, 658.8 g (1 mol) polytetrahydrofuran ether with M.W. c. 650 and OH-number 170 mg KOH/g (DuPont "Terathane 650") was added, and the mixture was stirred an additional 2-3 hr, until a substantially NCO-free resin was formed (NCO content less than 0.25 wt.%).

The viscosity of the resin at 60° C. was 5,800 to 6,000 mPasec. Dark storage stability at 60° C. was over 6 mo.

The following data refer to properties of steel plates and of films coated with the resin, after the resin was cured for 5 sec with 200 watt/inch of UV radiation with the addition of 2.5 wt.% of 1-(4-isopropylphenyl)-2-hydroxy-2-methylpropane-1-one ("Darocur 1116" of the firm Merck, of Darmstadt):

Koenig pendulum hardness according to DIN 53 157 (seconds): 30. Erichsen penetration according to DIN 53156 (mm): greater than 10. Layer thickness (microns): 65. Tensile strength according to DIN 53 455 (N/mm$^2$): 17.9±1.5. Elongation at breakage (in tensile strength test): 54.0±6.0%.

EXAMPLE 2

Urethane acrylate resin, based on IPDI and hydroxy esters.

The procedure was analogous to Example 1, but the 2nd reaction step entailed reaction with a hydroxy ester based on the following 3 components: adipic acid, 1,6-hexanediol, and 2,2-dimethyl-1,3-propanediol, in the mole ratio 4:2:3 (OH-number [of the ester] 108 mg KOH/g).

Results: NCO content 0.25 to 0.30 wt.%. Viscosity at 60° C. 7,750-7,850 mPa-sec. Dark storage stability at 60° C. greater than 6 mo.

The following data refer to properties of steel plates and of films, after curing as in Example 1:

Koenig pendulum hardness according to DIN 53 157 (seconds): 21. Erichsen penetration according to DIN 53 156 (mm): greater than 10. Tensile strength according to DIN 53 455 (N/mm$^2$): 6.8±0.4. Elongation at breakage (in tensile strength test): 64.0±4.0%.

EXAMPLE 3

Urethane urea acrylate resin, based on IPDI, a polyether, and a primary diamine.

Analogously to Example 1, in the 1st reaction stage 666 g (3 mol) IPDI was reacted with 179.1 g 2-hydroxyethyl acrylate until the NCO content was 22.36 wt.%. Then in the 2nd reaction step 477.3 g (0.75 mol) "Teracol 650" (DuPont) was added at 50°-60° C. After the end of the reaction, the NCO content was 9.52 wt.%. Finally, 400 g N-vinylpyrrolidone, for use as a reagent, was thinned with 633 g ethylhexyl acrylate. After addition of 0.4 g phenothiazine, a solution of 225.1 g 2,2,4-trimethylhexamethylenediamine (TMD) and 233 g N-vinylpyrrolidone was added to the reaction mixture under stirring, to yield a practically NCO-free urethane urea acrylate resin with NCO content less than 0.1 wt.%. Viscosity of the resin at 25° C. was 11,500-12,000 mPa-sec. Curing was for 3-4 sec with 1.0 wt.% "Darocur 1116" added to the mixture, and with a UV intensity of 200 W/in. The following data refer to after curing properties of coated steel plated and of films:

Koening pendulum hardness as above: 152 sec. Erichsen penetration as above: greater than 10 mm. Layer thickness: 88 microns. Tensile strength as above: 42.2±1.1 N/mm$^2$. Elongation at breakage, as above: 5.0±1.0%.

EXAMPLE 4

Urethane urea acrylate resin, based on IPDI, a polyether, and a primary/secondary diamino ester.

The reactants were all reacted analogously to Example 3, but in the last reaction step the following addition product of TMD and methacrylic acid methyl ester was substituted for the TMD:

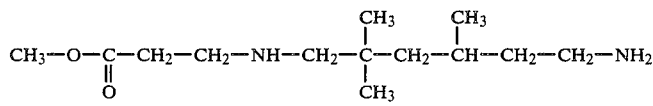

(mole ratio 1:1, namely 367.6 g (1.425 mol)). The NCO content of the resulting resin was less than 0.1 wt.%.

Viscosity of the resin at 25° C. was 4,500–4,600 mPa-sec. Dark storage stability at 60° C. was over 8 months.

The following are data refer to properties of coated steel plates and of films, after the resin was cured for 3–4 sec at 200 W/in (UV intensity), with addition of 1.0 wt.% Merck "Darocur 1116":
  Koenig pendulum hardness as above: 135 sec.
  Erichsen penetration as above: 9.5 sec.
  Layer thickness: 160 microns.
  Tensile strength as above: 40.6±0.7 N/mm$^2$.
  Elongation at breakage, as above: 7.0±1.0%.

EXAMPLE 5

Urethane urea acrylate resin, based on IPDI, a polyether, and a di-secondary diamino ester.

The preparation was analogous to Example 3, but in the last reaction step 510 g (1.425 mol) of the addition production of TMD and methacrylic acid methyl ester (in mole ratio 1:2) was substituted for the TMD. NCO content (of the product) was less than 0.1 wt.%.

The viscosity of the resin at 25° C. was 4,000–4,200 mPa-sec. Dark storage stability at 60° C. was over 8 months.

The following data refer to properties of coated steel plates and of films, after curing as in Example 4:
  Koenig pendulum hardness as above: 140 sec.
  Erichsen penetration as above: 9.5 mm.
  Layer thickness: 152 microns.
  Tensile strength as above: 42.1±0.3 N/mm$^2$.
  Elongation at breakage, as above: 7.0±1.0%.

EXAMPLE 6

Urethane urea acrylate resin, based on IPDI, a polyether, and a di-secondary diamine.

The preparation was analogous to Example 3, but in the last reaction step 205 g 1,2-bis(isopropylamino)ethane (1.425 mol) was used instead of the TMD.

The viscosity of the resin at 25° C. was 2,600–2,700 mPa-sec. Dark storage stability at 60° C. was greater than 8 months.

The following data refer to properties of coated steel plates and of films, after curing as in Example 4:
  Koenig pendulum hardness as above: 133 sec.
  Erichsen penetration as above: 9.3 mm.
  Layer thickness: 90 microns.
  Tensile strength as above: 41.2±2.8 N/mm$^2$.
  Elongation at breakage, as above: 2.0±0.0%.

EXAMPLE 7

Urethane urea acrylate resin, based on IPDI, a polyether, and water.

The preparation was analogous to Example 3, but in the last reaction step 25.6 g water (1.425 mol) is used in place of the TMD.

The viscosity of the resin at 25° C. was 1,500–1,600 mPa-sec. The NCO content of the resin was less than 0.2 wt.%. Dark storage stability at 60° C. was greater than 8 months.

The following data refer to properties of coated steel plates and of films, after curing as in Example 4:
  Koenig pendulum hardness as above: 110 sec.
  Erichsen penetration as above: greater than 10 mm.
  Layer thickness: 141 microns.
  Tensile strength as above: 35.2±0.5 N/mm$^2$.
  Elongation at breakage, as above: 6.0±1.0%.

EXAMPLE 8 (COMPARISON EXAMPLE)

Urethane urea acrylate resin, based on IPDI, a polyether, and a C$_{36}$ diamine of approximately the following formula of the diamine:

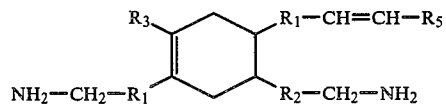

The diamine can be synthesized from C$_{18}$ segments of doubly unsaturated fatty acids, by diene synthesis, nitrilation, and amination.

The preparation of the resin was analogous to Example 3, but with use of the following materials: 3 mol IPDI, 1.5 mol 2-hydroxy-ethylacrylate, 954.6 g "Teracol ® 650" of the firm DuPont (OHZ 176) (1.5 mol), 376.2 g (0.7125 mol) the above-described C$_{36}$ diamine, 890.1 g 2-ethylhexyl acrylate, and 890.1 g N-vinylpyrrolidone. NCO content of the resin product was less than 0.2 wt.%.

Viscosity at 25° C. was 800–900 mPa-sec. Dark storage stability at 60° C. was less than 5 days.

The following data refer to properties of coated steel plates and of films, after curing as in Example 4:
  Koenig pendulum hardness as above: 15 sec.
  Erichsen penetration as above: greater than 10.0 mm.
  Layer thickness: 90 microns.
  Tensile strength as above: 12.4±1.2 N/mm$^2$.
  Elongation at breakage, as above: 124±5%.

EXAMPLE 9

Urethane urea acrylate resin, based on "Hylene W" (a dicyclohexylmethane diisocyanate, supplied by the firm DuPont), a polyether, and water.

The preparation was analogous to Example 7, but starting with 786 g (3 mol) "Hylene W".

NCO content of the resin was less than 0.3 wt.%. Viscosity of the resin at 25° C. was 28,500–30,000 mPa-sec. Dark storage stability at 60° C. was less than 3 days.

The following data refer to properties of coated steel plates and of films, after curing as in Example 4:
  Koenig pendulum hardness as above: 133 sec.
  Erichsen penetration as above: 8.3 mm.
  Layer thickness: 90 microns.
  Tensile strength as above: 34.0±2.2 N/mm$^2$.
  Elongation at breakage: 6±1%.

EXAMPLE 10

Urethane urea acrylate resin, based on TMDI (1,4-butanediisocyanate), a polyether, and water.

The preparation was analogous to Example 7, but starting with 630 g (3 mol) TMDI (2,2,4-trimethyl-1,6-hexanediisocyanate).

NCO content of the resin was less than 0.3 wt.%. Viscosity at 25° C. was 480–600 mPa-sec. Dark storage stability at 60° C. was less than 5 days.

The following data refer to properties of coated steel plates and of films, after curing as in Example 4:
Koenig pendulum hardness as above: 26 sec.
Erichsen penetration as above: greater than 10.0 mm.
Layer thickness: 85 microns.
Tensile strength as above: $14.0 \pm 0.8$ N/mm$^2$.
Elongation at breakage: $96 \pm 4\%$.

TABLE

COMPARISON OF SPECIFIC PROPERTIES OF URETHANE ACRYLIC RESINS AND URETHANE UREA ACRYLIC RESINS PRODUCED ACCORDING TO OR ANALOGOUSLY TO EXAMPLES 1-9. (CURING 200 WATTS/INC WITH UV MEDIUM INTENSITY LAMP.)

| No. | HEA[1] (Mol) | Poly-isocyanate (Mol) | Polyhydroxy-component (Mol) | Diamine (Mol) | $H_2O$ (Mol) | Dark Storage Stability at 60° C. | uv Curing Time (sec) | Amount of Photo-initiator (%) | Koenig Pendulum hardness (sec) | Taber[2] Wear test (mg) | Adhesion to Plastic | Acetone | MFK | Methanol cycles | EGA |
|---|---|---|---|---|---|---|---|---|---|---|---|---|---|---|---|
| 1 | — | 2 IPDI | 1 TERATHANE 650 | — | — | >6 mos. | 5 | 2.5 | 30 | 37 | poor | >150 | >150 | >150 | >150 |
| 2 | 2 | 2 IPDI | 1[3] (AS,HD,NPG) (4:2:3) | — | — | >6 mos. | 5 | 2.5 | 21 | 30 | poor | >150 | >150 | >150 | >150 |
| 3 | 1.5 | 3 IPDI | 0.75 TERATHANE 650 | 1.425 TMD | — | >8 mos. | 4 | 1.0 | 152 | 22 | very good | >150 | >150 | >150 | >150 |
| 4 | 1.5 | 3 IPDI | 0.75 TERATHANE 650 | 1.425 TMD/Mame* | — | >8 mos. | 4 | 1.0 | 135 | 18 | " | >150 | >150 | >150 | >150 |
| 5 | 1.5 | 3 IPDI | 0.75 TERATHANE 650 | 1.425 TMD/Mame | — | >8 mos. | 4 | 1.0 | 140 | 15 | " | 120 | 90 | >150 | >150 |
| 6 | 1.5 | 3 IPDI | 0.75 TERATHANE 650 | 1.425 Bis-(isopropyl-amino)-1,2-ethane | — | >8 mos. | 4 | 1.0 | 133 | 13 | " | >150 | >150 | >150 | >150 |
| 7 | 1.5 | 3 IPDI | 0.75 TERATHANE 650 | — | 1.425 | >8 mos. | 4 | 1.0 | 110 | 14 | " | >150 | >150 | >150 | >150 |
| 8 | 1.5 | 3 IPDI | 1.5 TERATHANE 650 | 0.7125 unsaturated $C_{36}$ diamine | — | <5 days | 4 | 1.0 | 15 | 17 | " | 60 | 30 | 60 | 50 |
| 9 | 1.5 | 3 IPDI | 0.75 TERATHANE 650 | — | 1.425 | <3 days | 4 | 1.0 | 133 | 15 | " | >150 | >150 | >150 | >150 |
| 10 | 1.5 | 3 IPDI | 0.75 TERATHANE 650 | — | 1.425 | <5 days | 4 | 1.0 | 26 | 11 | " | 120 | 120 | >150 | >150 |

[1] Hydroxyethylacrylate;
[2] H 22 Rollers, 500 g load, 100 u;
[3] Adipic Acid, Hexanediol, Neopentyl glycol;
A TMD: Methacrylic acid methyl ester, 1:1
MFK: Methacrylic acid methyl ester
*Mame = Methacrylic acid methyl ester

Having now fully described the present invention, it will be apparent to one of ordinary skill in the art that many changes and modifications can be made thereto without departing from the spirit or scope of the invention as set forth herein.

What is claimed as new and desired to be secured by Letters Patent of the United States is:

1. A storage-stable, substantially NCO-free urethane urea acrylate which after radiation curing forms strongly adhering, solvent resistant, wear resistant coatings comprising isophorone diisocyanate (IPDI) or adducts thereof which have been partially acrylated with one or more hydroxyacrylates to the extent of about 10–25 equivalent %, which material subsequently has been reacted to the extent of about 10–75 equivalent % with one or more polyhydroxy compounds, wherein the remaining NCO equivalents have been fixed with urea bonds with one or more primary or secondary diamino compounds having about 2 to 18 carbon atoms.

2. The storage-stable urethane urea acrylate of claim 1, wherein said hydroxyacrylate is a hydroxyalkyl acrylate having about 1 to 4 carbon atoms.

3. The storage-stable urethane urea acrylate of claim 2, wherein said hydroxyacrylate is hydroxyethylacrylate.

4. The storage-stable urethane acrylate of claim 1, wherein said polyhydroxy compound is a di-, tri- or tetrafunctional hydroxy compound having an aliphatic, cyclic or aromatic structure and having a molecular weight of about 100–5,000.

5. The storage-stable urethane urea acrylate of claim 4, wherein said polyhydroxy compound is polytetrahydrofuran ether.

6. The storage-stable urethane urea acrylate of claim 4, wherein said polyhydroxy compound is a mixture of adipic acid, 1,6-hexanediol and 2,2-dimethyl-1,3-propanediol.

7. The storage-stable urethane urea acrylate of claim 1, wherein said primary or secondary diamino compound having about 2 to 18 carbon atoms is an aliphatic, cycloaliphatic or aromatic primary or secondary diamino compound.

8. The storage-stable urethane urea acrylate of claim 1, wherein said primary or secondary diamino compound is 2,2,4-trimethylhexamethylenediamine (TMD), a 1:1 addition product of (TMD) and methacrylic acid methyl ester, a 1:2 addition product of (TMD) and methacrylic acid methyl ester, or 1,2-bis(isopropylamino)ethane.

9. The storage-stable urethane urea acrylate of claim 1, wherein said primary or secondary diamino compound further contains an acrylic or methacrylic acid ester group.

10. A storage-stable, substantially NCO-free urethane urea acrylate produced by
   (a) partially acrylating isophorone diisocyanate (IPDI) or adducts thereof with one or more hydroxyacrylates to the extent of about 10–25 equivalent %,
   (b) subsequently reacting the partially acrylated isophorone diisocyanate or adducts thereof to the extent of about 10–75 equivalent % with one or more polyhydroxy compounds, and
   (c) fixing the remaining NCO equivalents with urea bonds by reacting the NCO groups with one or more primary or secondary diamino compounds having about 2 to 18 carbon atoms.

11. A method of producing the storage-stable, NCO-free urethane urea acrylate of claim 1 which comprises:
   (a) partially acrylating isophorone diisocyanate (IPDI) or adducts thereof with one or more hydroxyacrylates to the extent of about 10–25 equivalent %,
   (b) subsequently reacting the partially acrylated isophorone diisocyanates or adducts thereof to the extent of about 10–75 equivalent % with one or more polyhydroxy compounds, and
   (c) fixing the remaining NCO equivalents with urea bonds by reacting the NCO groups with one or more primary or secondary diamino compounds having about 2 to 18 carbon atoms.

* * * * *